United States Patent [19]
Onosaka

[11] Patent Number: 5,812,645
[45] Date of Patent: Sep. 22, 1998

[54] TELEPHONE SYSTEM AND TELECOMMUNICATION METHOD AND APPARATUS AUTOMATICALLY FORMING DIRECTORY AND INDICATING MESSAGE AND BATTERY STATUS

[75] Inventor: Kazunobu Onosaka, Tokyo, Japan

[73] Assignee: Sony Corporation, Tokyo, Japan

[21] Appl. No.: 703,839

[22] Filed: Aug. 27, 1996

Related U.S. Application Data

[63] Continuation of Ser. No. 267,948, Jul. 6, 1994.

[30] Foreign Application Priority Data

Jul. 9, 1993 [JP] Japan .................................. 5-170198
Sep. 14, 1993 [JP] Japan .................................. 5-252303

[51] Int. Cl.$^6$ .................................................. H04M 11/00
[52] U.S. Cl. .................................. 379/93.23; 379/93.19; 379/93.24; 379/93.17
[58] Field of Search ................................ 379/96, 97, 98, 379/93, 100, 354, 355, 356, 357, 442, 131, 93.23, 93.17, 93.19, 93.21, 93.24, 93.25, 93.09, 93.01, 93.28, 100.06, 100.05

[56] References Cited

U.S. PATENT DOCUMENTS

| | | | |
|---|---|---|---|
| 4,524,244 | 6/1985 | Faggin et al. ............................... | 379/96 |
| 4,656,657 | 4/1987 | Hunsicker ................................. | 379/131 |
| 4,710,951 | 12/1987 | Hezono .................................... | 379/100 |
| 4,821,107 | 4/1989 | Naito et al. .............................. | 379/100 |
| 4,852,153 | 7/1989 | Streck ...................................... | 379/442 |
| 4,910,610 | 3/1990 | Utsugi ..................................... | 379/100 |
| 4,924,493 | 5/1990 | Dang et al. ............................... | 379/96 |
| 4,987,588 | 1/1991 | Fukuma et al. .......................... | 379/442 |
| 5,065,425 | 11/1991 | Lecomte et al. .......................... | 379/96 |
| 5,093,857 | 3/1992 | Yoshida et al. ........................... | 379/96 |
| 5,119,414 | 6/1992 | Izumi ...................................... | 379/354 |
| 5,136,637 | 8/1992 | Rust et al. ............................... | 379/355 |
| 5,142,563 | 8/1992 | Nyuu et al. ............................... | 379/61 |
| 5,317,630 | 5/1994 | Feinberg et al. .......................... | 379/96 |
| 5,327,486 | 7/1994 | Wolff et al. ............................... | 379/96 |

FOREIGN PATENT DOCUMENTS

| | | |
|---|---|---|
| 0 196 815 | 10/1986 | European Pat. Off. . |
| 0 354 703 | 2/1990 | European Pat. Off. . |
| 0 450 550 | 10/1991 | European Pat. Off. . |
| 0 474 555 | 3/1992 | European Pat. Off. . |
| 36 07 684 | 9/1987 | Germany . |

OTHER PUBLICATIONS

Durkin, G.M., "QWERTYphone—A Low–Cost Integrated Voice/Data Terminal," British Telecommunications Engineering, vol. 5, part 4, Jan. 1987, pp. 276–280.

Ruiz, Antonio, "Voice and Telephony Applications for the Office Workstation," Proceedings 1st International Conference on Computer Workstations, 1985, pp. 158–163.

*Primary Examiner*—Stella Woo
*Attorney, Agent, or Firm*—Ronald P. Kananen

[57] ABSTRACT

A telephone system is controlled by an information processor which is capable of receiving and transmitting signals that indicate various operating states of the telephone unit. According to one aspect of the invention, the information processor formulates a telephone directory based on dial information, that is, information indicative of a number called and further determines both the start time and end time of a message based on a detected state of a telephone handset. According to another feature of the invention, data communication may be conducted normally even if an inadvertent call is made during transmission.

27 Claims, 15 Drawing Sheets

26

| NAME | TARO YAMADA | 26a |

| ADDRESS | GOTANDA AN BUILDING, 1-22-1, HIGASHI GOTANDA, SHINAGAWA-KU, TOKYO 141 | 26b |

| PHONE NUMBER | 03-3448-0000 | 26c |

| PHONE LOG | MARCH5 1991:13:00-13:05<br>MARCH6 1993:19:27-19:35<br>MARCH10 1993:09:00-09:05 | 26d |

| BIRTH DAY | APRILL. 10. 1960 | 26e |

MEMO — 26f (map showing BANK, STREET, HERE, BANK)

| DATE | FORMUCATED MARCH5, 1993 | 26g |

| OWNER NAME | JIRO YAMADA | 26h |

FIG.7

TELEPHONE SYSTEM AND TELECOMMUNICATION METHOD AND APPARATUS AUTOMATICALLY FORMING DIRECTORY AND INDICATING MESSAGE AND BATTERY STATUS this application is a continuation of application Ser. No. 08/267,948 filed Jul. 6, 1994.

BACKGROUND OF THE INVENTION

This invention relates to a telephone system and a telecommunication system for controlling and realizing a new function of the telephone system. More particularly, it relates to a telephone system and to an information processing system or telecommunication system having a telephone directory formulating function and a data communication function.

There has recently developed an information processor, such as a terminal for communication of personal information controlling a telephone set, a so-called electronic memorandum or a small-sized computer.

It is possible with such processor to manage addresses or telephone numbers or to perform data communication over a telephone network, such as so-called electronic mail. However, since the telephone set and the processor are not interconnected so as to provide bi-directional communication, a number of inconveniences have been raised.

For example, in the telephone number management function in such processor, a telephone number is stored or registered as a telephone directory and, when the user makes a telephone call, the processor opens a page in which the telephone number of the called party is entered and reference is had to the telephone number shown therein to initiate a dialling operation.

There is also known an information processor in which, when the user designates one of the registered telephone numbers, such telephone number is transferred to the telephone set to initiate the dialling operation.

With the above-described conventional information processor, if the user makes a telephone call to a party whose telephone number is not recorded in the telephone directory and subsequently intends to have the telephone number of the called party registered in the telephone directory, it is necessary to re-enter the telephone number in the information processor, which resulting in a redundant operation.

In addition, the conventional information processor lacks a function for maintaining a log or record of, for example, telephone numbers of the parties to whom the user made calls in the past, or the telephone call time.

On the other hand, in the information processor designed for data communication, the conventional practice has been to connect a modem in the telephone network to which is connected the telephone set, and to make the data communication over the modem.

Meanwhile, if the user inadvertently makes a telephone call, with the telephone being off-hook, during the time data communication is performed, the telephone call represents a noise with respect to the data communication, so that the data communication results in a failure. That is, it is not possible with the conventional information processor to inform the user intending to make a telephone call of the fact that data communication is being made on the same telephone network. Consequently, it occurs frequently that the user inadvertently makes a telephone call despite the fact that data communication is being made on the same telephone network.

In addition, whether there is any data received by the data communication, that is whether an electronic mail has been received or whether there is any electronic mail which is not as yet read, can be ascertained only by running the electronic mail software and checking the display on the display screen. That is, it has not been possible with the conventional information processor to check for the possible presence of the unread electronic mail if the processor is in the so-called power save mode or the sleep mode for reducing power consumption.

On the other hand, with a battery-driven information processor, it is necessary for the user to run a software for detecting the charged state of the battery and to check the information concerning the charged state displayed on the display screen. Thus it is necessary with the conventional information processor to turn on the power source and subsequently to run the software despite the fact that charging is made with the power source switch turned off.

BRIEF SUMMARY OF THE INVENTION

It is an object of the present invention to provide a telephone system controlled by an information processor capable of receiving and transmitting signals indicating various operating states of the telephone unit.

It is another object of the present invention to provide a novel telephone system in which the telephone system transmits the hook information for making distinction between the on-hook state and the off-hook state of the handset and the dial information indicating the telephone numbers, and in which the information processor formulates a telephone directory based upon the dial information and collects the message start time and the message end time as obtained by a timepiece.

It is another object of the present invention to provide a novel telephone system in which data communication may be prosecuted as normally even if the user inadvertently makes a telephone call in the course of the data communication and in which the charged state or the possible presence of electronic mail may be ascertained in the power down state of the information processor.

BRIEF DESCRIPTION OF THE DRAWINGS

FIG. 7 is a representative view of a personal information log.

DESCRIPTION OF THE PREFERRED EMBODIMENTS

Figure 1:
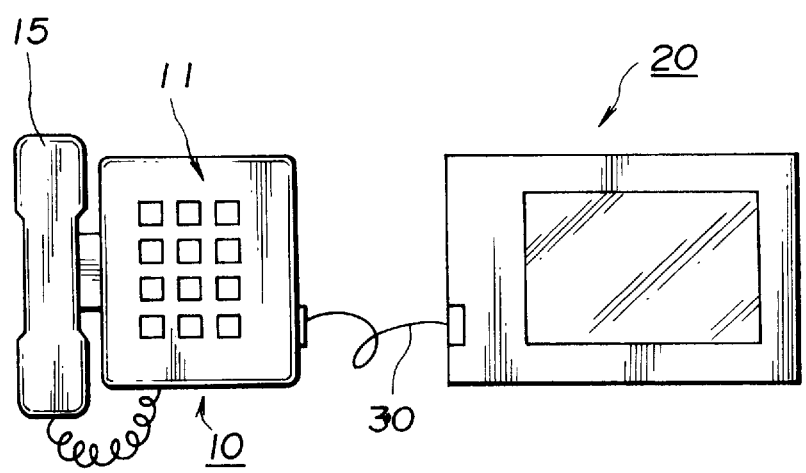
FIG. 1 is a representative view of a telephone system according to a first embodiment of the present invention.

Referring to the drawings, the telephone system according to the present invention will be explained in detail. First of all, a first embodiment of the present invention which performs the telephone number management function will be explained with reference to FIGS. 1 to 7.

Referring first to FIG. 1, a telephone unit 10 embodying the present invention includes a handset 15 and a key pad 11 for the user to perform dialling, such that, when the user makes a call using the key pad 11 and communication is established, it becomes possible for the user to communicate with the called party with the aid of the handset 15. At this time, the hook information for discrimination between the on-hook state and the off-hook state of the handset 15 and the dialling information indicating the telephone number may be transmitted to the information processor 20 via a serial cable 30 interconnecting the key pad 11 and the information processor 20. The information processor 20 formulates the telephone directory based upon the dialling information as received and maintains a log of the call information by collecting the call start time and the call end time based upon the hook information.

Figure 2:
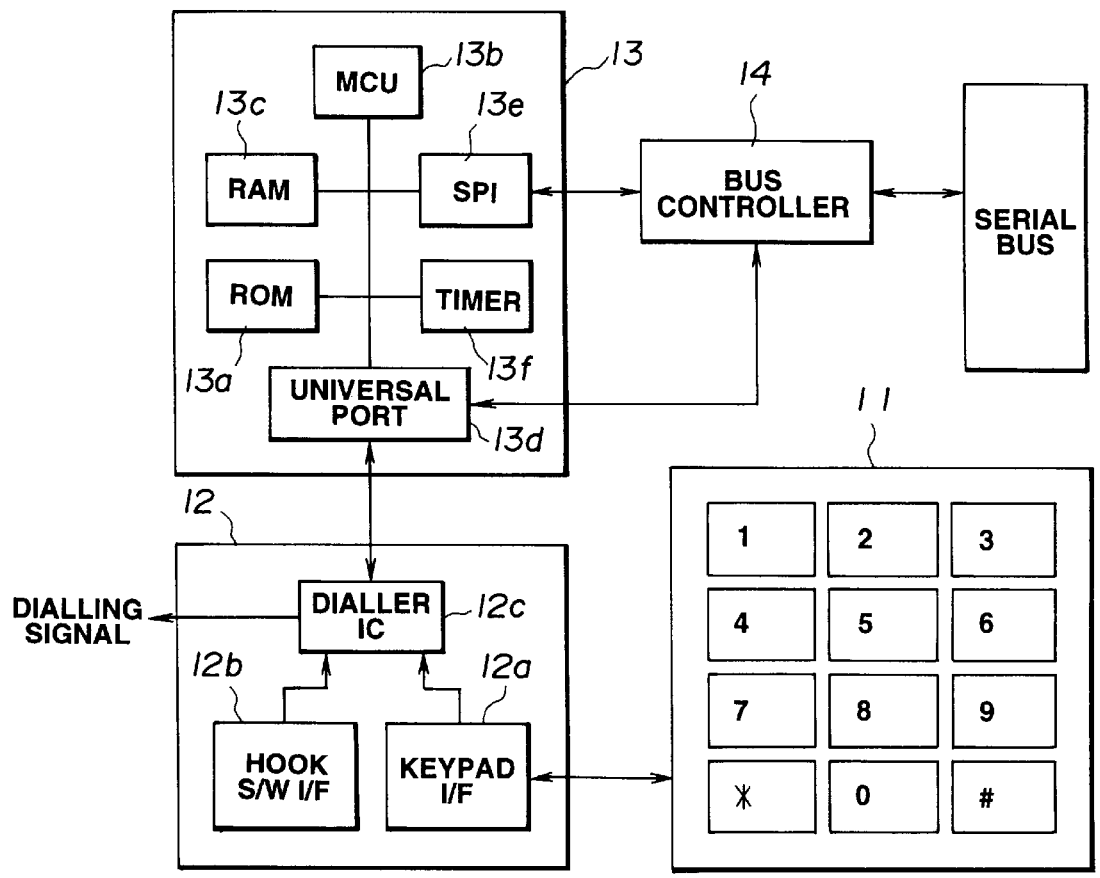
FIG. 2 is a block diagram which illustrates an information processor and telephone circuit with a numeric keypad.

Specifically, the telephone unit 10 includes the above-mentioned key pad 11 having e.g. 12 key switches, a telephone circuit 12 for converting the matrix information from the key pad 11 into the dialling information in order to effect dialling and to output the dialling information or the like, a one-chip micro-computer MPU 13 for transmitting the dialling information or the like from the telephone circuit 12 to the information processor 20, and a bus controller 14 for controlling data flow on the serial cable 30 or serial bus, as shown for example in FIG. 2.

The telephone circuit 12 includes a keypad interfacing circuit (keypad I/F) 12a for converting the matrix information from the keypad 11 into the calls information, a hook switch interfacing circuit (hook S/W I/F circuit) 12b for detecting the hook state of the handset 15 for outputting the hook information, and a dialler circuit 12c for making dialling based upon the dialling information from the keypad I/F circuit 12a and for outputting the hook information and the dialling information to the MPU 13, as also shown in FIG. 2.

When the user lifts the handset thereby going to an off-hook state, the hook S/W I/F circuit 12b detects such state and routes the hook information making distinction between the on-hook state and the off-hook state to the dialler circuit 12c.

When next the user actuates the keypad 11, the keypad I/F circuit 12a converts the matrix information from the keypad 11 into the dialling information which is supplied to the dialler circuit 12c. The dialler circuit 12 c transmits dialling signals such as dial pulse signals or so-called MF signals to the telephone network based upon the dialling information. The dialler circuit 12c also routes the hook information supplied from the hook S/W I/F circuit 12b and the dialling information supplied from the keypad I/F circuit 12a to the MPU 13 over e.g. two serial transmission lines, not shown.

The MPU 13 includes a read-only memory (ROM) 13a for storing control programs and so forth, a micro-computer MCU 13b for executing the control programs stored in the ROM 13a, a random access memory (RAM) 13c for storing data for executing the control programs, a universal port 13d for receiving the hook information and the dialling information from the dialler circuit 12c, a serial-parallel interfacing circuit SPI 13e for transmitting the hook information and the dialling information, and a timer 13f for time setting.

The MCU 13b executes the control program stored in the ROM 13a in order to control various components of the telephone unit. Additionally, the MCU 13b transmits the hook information and the dialling information supplied via the universal port 13d to the information processor 20 via the SPI circuit 13e having the function of serial half-duplex synchronous communication.

Figure 3:
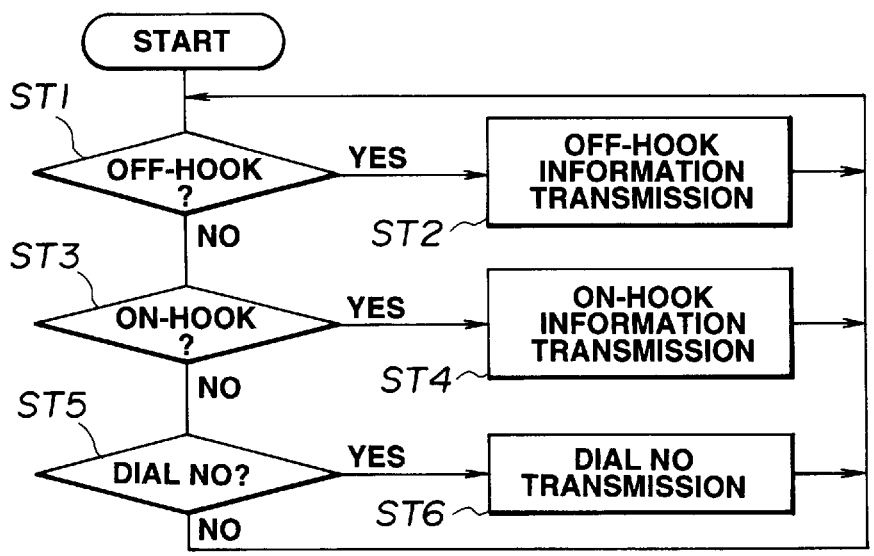
FIG. 3 is a flow chart describing a method according to the present invention.
Figure 5:
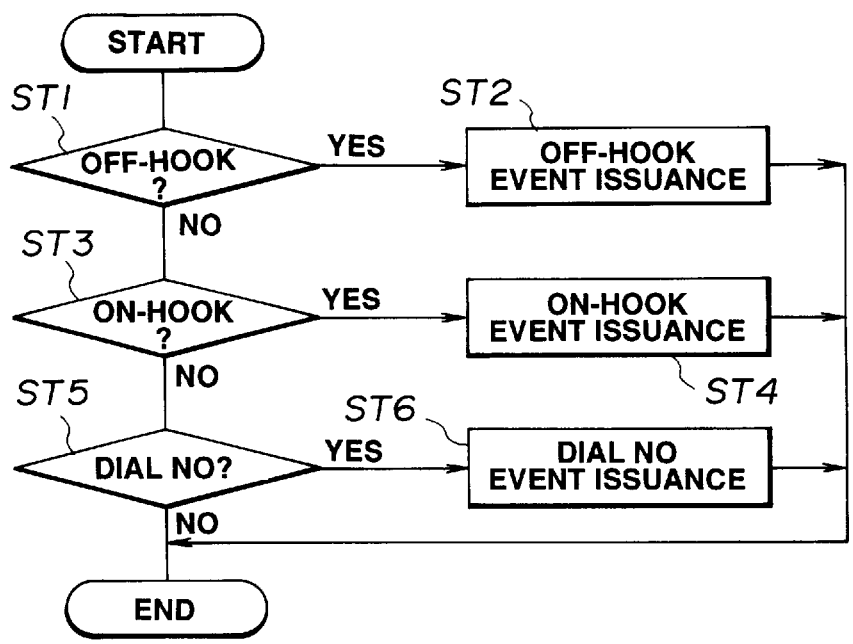
FIG. 5 is a flow chart which illustrates an interrupt operation.

Specifically, at a step ST1 of a flow chart of FIG. 3, the MCU 13b detects whether or not the handset is uplifted and thus is an off-hook state. If the result is YES, the MCU 13b transfers to a step ST2 and, if otherwise, the MCU 13b transfers to a step ST3. That is, if the user lifts the handset 15 in order to make a telephone call, the corresponding one of the bits at the universal port 13d goes high, as an example, which is detected by the MCU 13b.

At the step ST2, the MCU 13b sets a pre-set number of bits at the universal port 13d to pre-set values and subsequently writes data indicating the off-hook state in a data register of the SPI circuit 13e. The MPU 13b then reverts to the step ST1. That is, the SPI circuit 13e and the bus controller 14 are interconnected by a bi-directional data line and a clock line, not shown. By setting the pre-set values at the pre-set small number of bits in the universal port 13d, the bus controller 14 is in the state of outputting data over the serial bus, so that data representing the off-hook state is enabled to be outputted from the data register of the SPI circuit 13e to the information processor 20.

At the step ST3, the MCU 13b detects whether the handset 15 is brought to the on-hook state. If the result is YES, the MCU 13b proceeds to a step ST4 and, if otherwise, the MCU 13b proceeds to a step ST5. That is, if, after the end of the telephone call, the user sets the handset 15, corresponding bits at the universal port 13d go to the low level, which is detected by the MCU 13b.

At the step ST4, the MCU 13b sets pre-set values in a pre-set small number of bits at the universal port 13d, as at the step ST2. The MCU 13b then writes data indicating the on-hook state in the data register of the SPI circuit 13e before reverting to the step ST1. As a result, data representing the on-hook state, as written in the data register of the SPI circuit 13e, is transmitted to the information processor 20.

At the step ST5, the MCU 13b detects whether dialling has been made. If the result is YES, the MCU proceeds to a step ST6 and, if otherwise, the MCU reverts to the step ST1. That is, if the user makes a dialling, using the keypad 11, after having lifted the handset, the MCU 13b detects the dialling information supplied via the universal port 13d, and transmits the dialling information to the information processor 20, as in the case of transmitting the hook information as described above.

Figure 4:
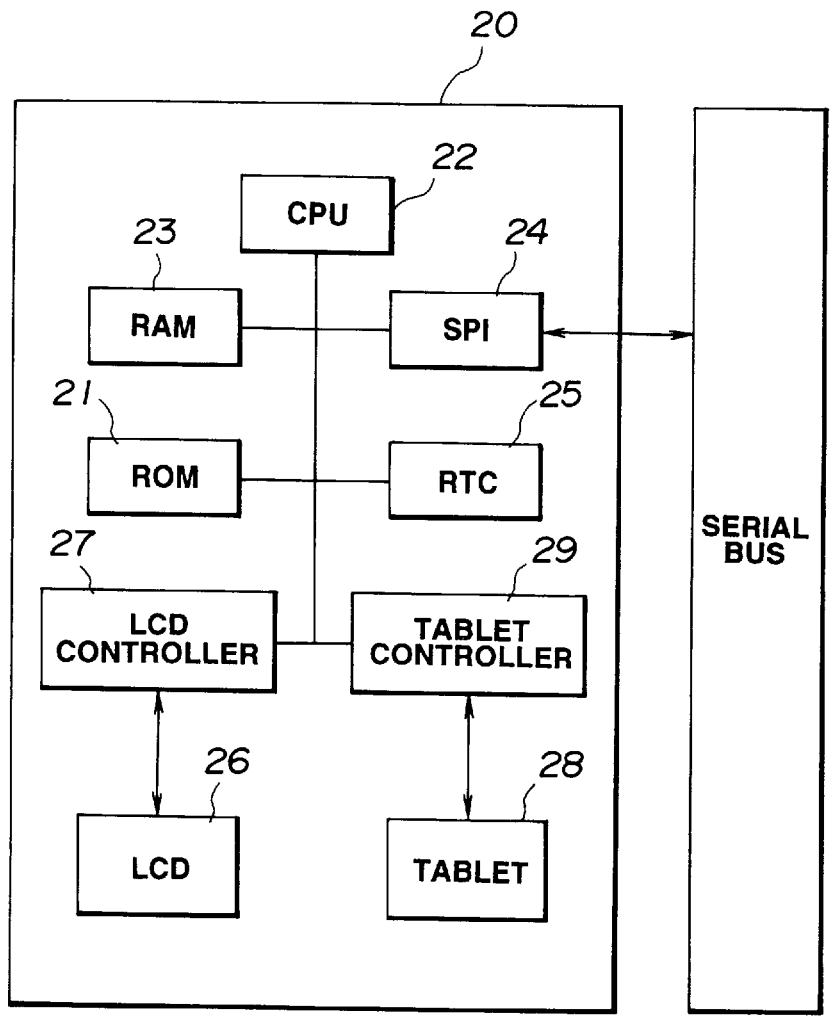
FIG. 4 is a block diagram which illustrates an information processor according to the present invention.

The information processor 20 may for example be a small-sized computer or an electronic memorandum and, as shown for example in FIG. 4, comprises a ROM 21 having a variety of application programs stored therein, and a CPU 22 for executing the application programs stored in the ROM 21. In addition, the information processor 20 comprises a RAM 23, an SPI circuit 24 for receiving the hook information and the dialling information from the telephone unit 10, real-time clocks (RTC) 25 for deriving the time, a display for example, a liquid crystal panel (LCD) 26, for displaying the results of execution of the application programs, an LCD controller 27 for controlling the LCD 26, a tablet 28 for the user to enter letters or the like, and a tablet controller 29 for controlling the tablet 28.

The ROM 21 has stored therein a variety of application programs, such as kana-kanji conversion programs for word processing, dictionary tables therefor or handwritten letter recognition programs. In addition the ROM 21 has stored therein an address management program for formulating a telephone directory based upon the hook information and the dialling information as received from the telephone unit and for maintaining a message log.

The CPU 22 executes the application programs stored in the ROM 21 and routes the results of execution, which is data, to the LCD controller 27. The LCD 26 makes a display of the results of execution. The tablet 28 is of a transparent piezoelectric type and is mounted on the front side of the LCD 26. When the user writes on the tablet 28, using a pen, not shown, for example, the tablet controller 29 detects the coordinates of the pressure point, and routes the resulting coordinate information to the CPU 22. With the aid of the handwritten letter recognition program, the CPU 22 recognizes entered commands or entered letters, based upon the coordinate information, and causes the handwritten letters to be stored in the RAM 23 or causes the entered document or file to be displayed on the LCD 26. The CPU 22 also formulates the telephone directory, based upon the dialling information received from the telephone unit 10, or maintains the message log based on the hook information.

Specifically, when the SPI circuit 24 receives the hook information and the dialling information from the telephone unit 10 over the serial bus 30, it causes an interrupt to the CPU 22. On reception of the interrupt, the CPU 22 executes the interrupt processing in accordance with the flow chart shown, for example, in FIG. 5.

That is, at the step ST1, the CPU 22 determines whether or not the hook information is data indicating the off-hook information. If the result is YES, the CPU 22 proceeds to the step ST2 and, if otherwise, the CPU proceeds to the step ST3.

At the step ST2, the CPU 22 registers the off-hook event, that is, it causes data indicating the off-hook state to be stored in a pre-set address in the RAM 23 before the program comes to an end.

That is, at the step ST3, the CPU 22 determines whether or not the hook information is data indicating the on-hook information. If the result is YES, the CPU 22 proceeds to the step ST4 and, if otherwise, the CPU proceeds to the step ST5.

At the step ST4, the CPU 22 causes the on-hook event to be registered, before the program comes to an end.

At the step ST5, the CPU 22 determines whether or not the dialling information has been received. If the result is YES, the CPU 22 causes a dialling number event to be registered before the program comes to a close.

The CPU 22 then executes the address management program for formulating a telephone directory stored in the ROM 21 in order to formulate t he telephone directory based upon each event registered as described above, that is it causes telephone numbers to be stored or registered in the RAM 23. In addition, the CPU 22 collects the message log comprise d of telephone numbers, call start time and the call end time, and causes them to be stored in the RAM 23.

Figure 6:
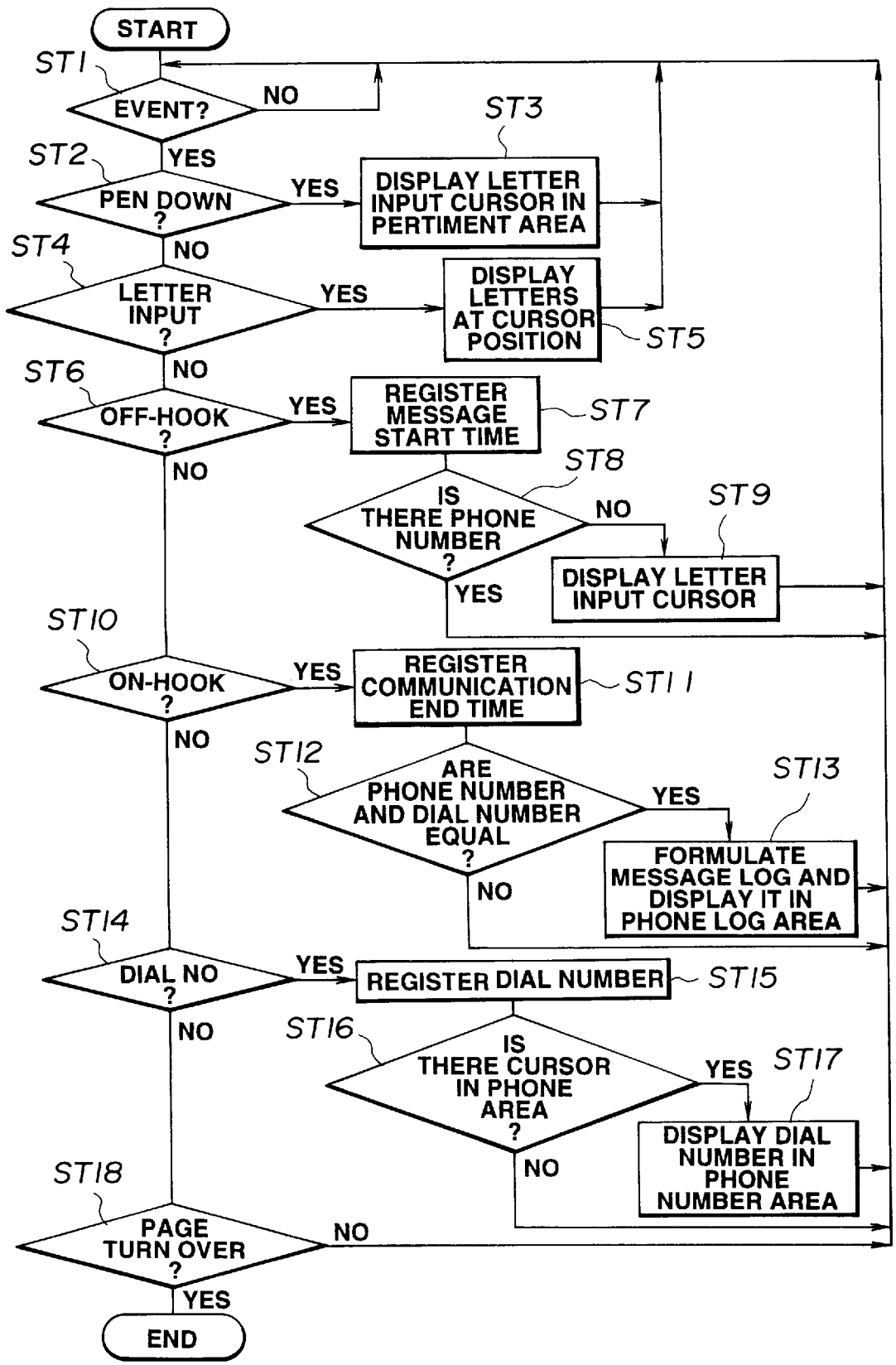
FIG. 6 is a flow chart describing an operation of a processor according to the present invention.

Specifically, referring to the flow chart of FIG. 6, the CPU 22 monitors an event at a step ST1. If such event is found to have been registered, the CPU 22 proceeds to a step ST2.

At the step ST2, an address card, which is an arbitrary page of the telephone directory having recorded therein the personal information including a name, address or a telephone number, is displayed on the LCD 26, as shown for example in FIG. 7. The CPU 22 determines, based upon the coordinate information from the tablet controller 29, whether or not the user is using his or her pen. If the result of decision is YES, the CPU 22 proceeds to a step ST3 and, if otherwise, the CPU 22 proceeds to a step ST4.

Using the coordinate information from the tablet controller 29, the CPU 22 causes, at the step ST3, a letter entry cursor to be displayed at the leading end of a display region of the LCD 26 at which the user puts his or her pen, before the CPU 22 reverts to the step ST1. For example, if the user puts his or her pen in a name region 26a of the display screen of the LCD 26 displaying the name, the CPU 22 causes the letter entry cursor to be displayed at the leading end of the name region 26a, as shown in FIG. 7.

At the step ST4, the CPU 22 decides, based upon the coordinate information from the tablet controller 29, whether or not a letter has been entered. If the result of decision is YES, the CPU 22 proceeds to the step ST5 and, if otherwise, the CPU 22 transfers to a step ST6.

At a step ST5, the CPU 22 executes the handwritten letter recognition program, and recognizes the entered letter, while displaying the recognized letter at the position at which the letter entry cursor is displayed. The CPU 22 then reverts to the step ST1. That is, the name entered by the user is displayed.

At a step ST6, the CPU 22 determines whether or not the event at the step ST1 is the off-hook event. If the result of decision is YES, the CPU 22 proceeds to a step ST7 and, if otherwise, the CPU 22 proceeds to a step ST10.

At the step ST7, the CPU 22 reads the current time from the RTC 25 as the call start time, and causes the current time thus read to be temporarily stored in the RAM 23. The CPU 22 then proceeds to a step ST8.

At the step ST8, the CPU 22 decides whether or not the telephone number is indicated in a telephone number region 26c of the currently displayed address card, that is whether or not the telephone number has already been registered. If the result of decision is YES, the CPU 22 reverts to the step ST1 and, if otherwise, the CPU 22 proceeds to a step ST9.

At the step ST9, the CPU 22 displays the letter entry cursor at the leading end of the telephone number region 26c, before reverting to the step ST1.

At the step ST10, the CPU 22 decides whether or not the event at the step ST1 is the on-hook event. If the result of decision is YES, the CPU 22 proceeds to a step ST11 and, if otherwise, the CPU 22 proceeds to a step ST14.

At the step ST11, the CPU 22 reads the current time from the RTC 25 as the call end time and causes the thus read current time to be temporarily stored in the RAM 23. The CPU 22 then proceeds to a step ST12.

At the step ST12, the CPU 22 decides whether or not the telephone number already registered at a step ST15, which will be explained below, is equal to the telephone number displayed in a telephone number region 26c at a step ST17, which will also be explained below. If the result of decision is YES, the CPU 22 proceeds to a step ST13 and, if otherwise, the CPU 22 reverts to the step ST1.

At the step ST13, the CPU 22 causes the call start time and the call end time, as stored in the RAM 23, to be stored in the RAM 22 as part of the message log for the telephone number displayed in the telephone number region 26c. The CPU 22 also causes them to be displayed in a telephone log region 26d.

At the step ST14, the CPU 22 gives a decision as to whether or not the event at the step ST1 is the dial number event. If the result of decision is YES, the CPU 22 proceeds to a step ST15 and, if otherwise, the CPU 22 proceeds to a step ST18.

At the step ST15, the CPU 22 causes the dialling information to be stored or registered as the telephone number in the RAM 23 before proceeding to a step ST16.

At the step ST16, the CPU 22 gives a decision as to whether or not the letter entry cursor is located in the telephone number region 26c. If the result of decision is YES, the CPU 22 proceeds to the step ST17 and, if otherwise, the CPU 22 reverts to the step ST1.

At the step ST17, the CPU 22 causes the telephone number to be displayed in the telephone number region 26c, before reverting to the step ST1.

If the user enters the information, such as the letter information, in a birthday region 26e or a memo region 26f, as the occasion may demand, and folds the address card or page, the CPU 22 causes data on the address card to be stored at the step ST18 in the RAM 23, before the program comes to a close.

In this manner, with the present information processor 20, each time the user makes a telephone call, the dialling information sent from the telephone unit 10 is received and an unregistered telephone number may be registered. Thus, contrary to the conventional practice, it is unnecessary for the user to enter the telephone number in the information processor after making the telephone call. On the other hand, massage logs can be maintained based upon the hook information transmitted from the telephone unit 10.

In addition, the information processor 20 is designed so that, if the user designates a certain telephone number registered in the telephone directory, the designated telephone number may be transmitted to the telephone unit 10 which then dials the telephone number in order to make a telephone call. Not only can the user make a telephone call in this manner, but also a file, such as a document, stored in the RAM 23, may be transmitted to the information processor of the called party.

A second embodiment of the telephone system which performs the data communication will now be explained by referring to FIGS. 8 to 16.

Figure 8:
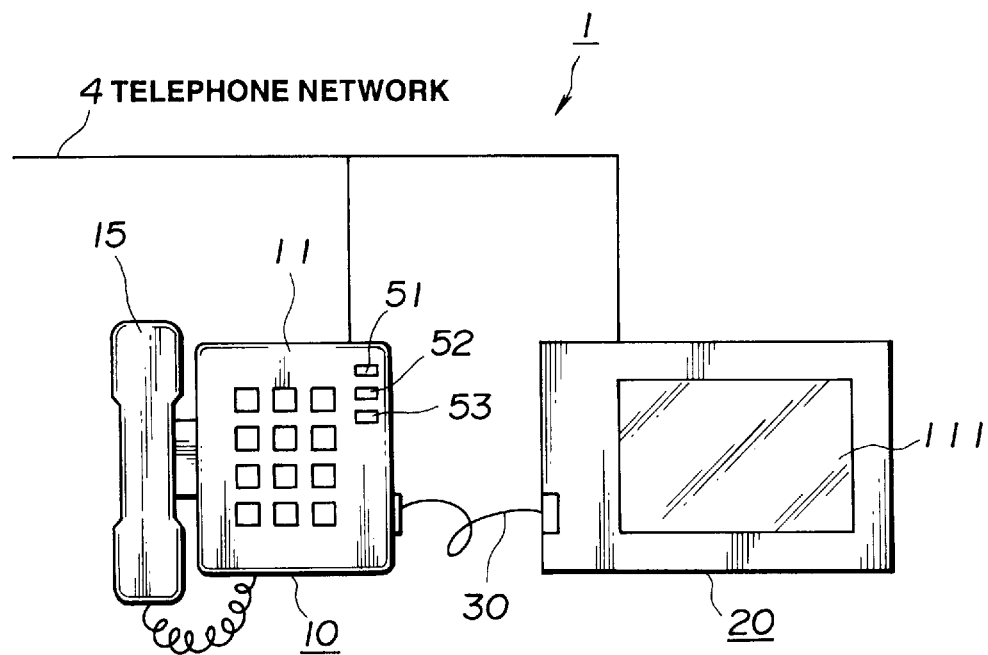
FIG. 8 is a telephone system according to a second embodiment of the invention.

An information communication terminal 1, according to the second embodiment of the present invention, is made up of an information processor 20, such as an electronic memorandum, a portable computer or a small-sized computer, and a telephone unit 10, as shown in FIG. 8. The telephone unit 10 is designed so that, when the user uplifts a handset 15 to produce an off-hook state, and dials with the aid of the key pad 11, in order to establish a message channel, the user is at a position to exchange messages with the called party using the handset 15.

On the other hand, the information processor 20 executes various application programs and displays the results of the execution on a display screen comprised of a liquid crystal display (LCD) 111, while performing data communication, such as exchange of electronic mail, over a telephone network 4 to which the telephone unit 10 is connected and which includes a so-called tip and ring.

The information processor 20 also outputs the information indicating the state of the information processor 20 for display on the LCD 111, that is it outputs the information indicating that data communication is proceeding, the information showing the possible presence of newly received electronic mail or un-read electronic mail, or the information indicating the charged state of the storage battery to the telephone unit 10 over a serial cable 30. The information processor 20 also makes the displays based upon the above information. That is, it turns light emitting diodes (LEDs) 51, 52 and 53 on and off. During the time data communication is going on with the information processor 20, the telephone unit 10 is disconnected from the telephone network 4, based upon the information indicating that data communication is going on with the information processor 20.

Figure 9:
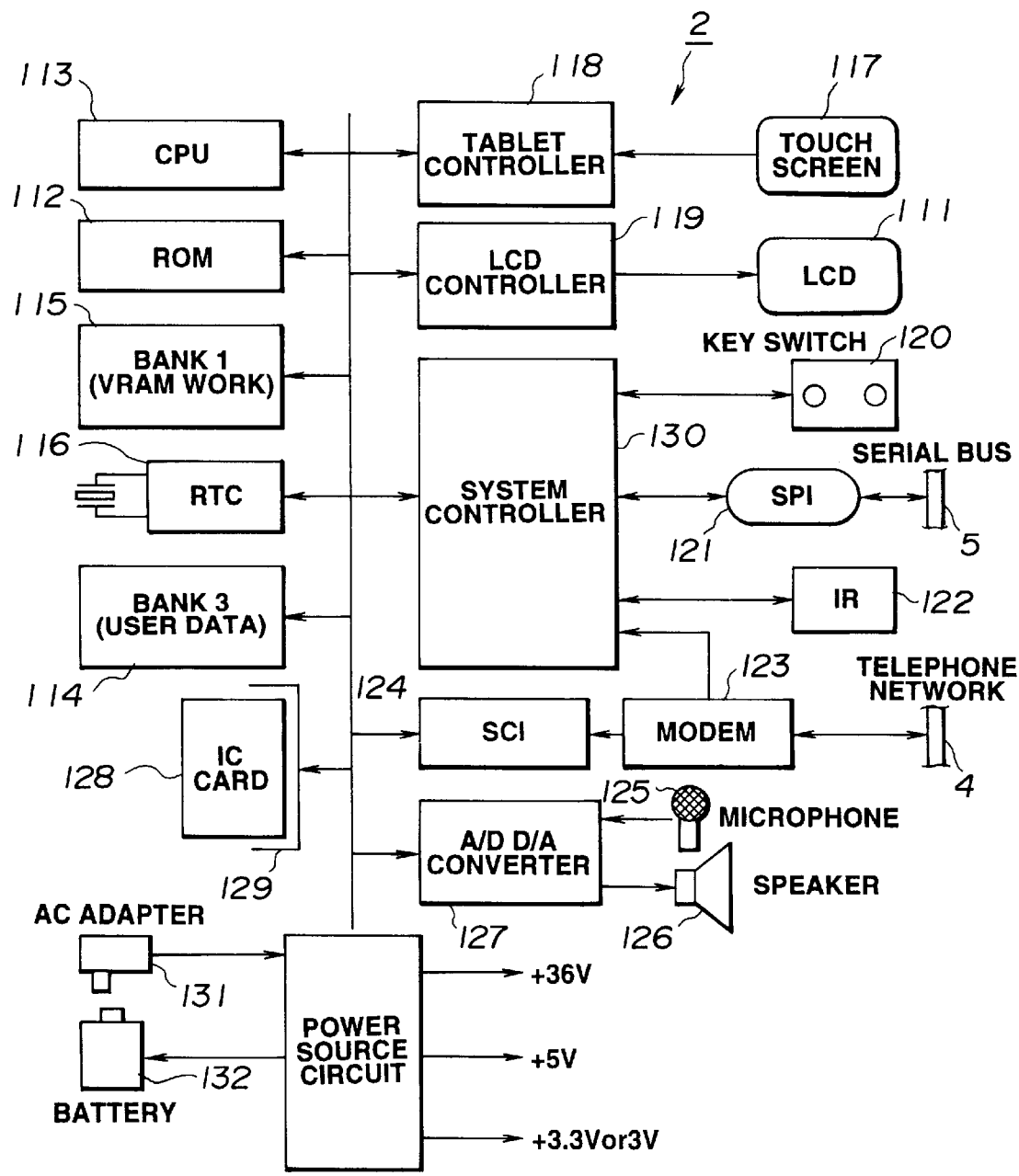
FIG. 9 is a more detailed view of the telephone system according to the second embodiment of the invention.

Specifically, the information processor 20 includes, as shown for example in FIG. 9, a read-only memory (ROM) 112 having stored therein an operating program (OS) and a variety of application programs, a central processing unit (CPU) 113 for executing the programs stored in the ROM 112 and a random access memory (RAM) 114 for storing data. In addition, the information processor 20 includes a video RAM 115 for storing picture data for display on the LCD 111, a real time clock (RTC) 116 for managing the timing, a tablet for entering the information by the user (touch-screen) 117, a tablet controller 118 for controlling the touch-screen 117 and an LCD controller 119 for controlling the LCD 111. The information processor 20 also includes a key switch 120 for the user to enter the information, an SPI 121 for data transmission and reception with the telephone unit 10 over the serial cable 30, an IR interface IR 122 for having data communication with an exterior device by infrared rays, a MODEM unit 123 for having data communication over the telephone network 4, and an SCI 124 for interfacing with the CPU 113. The information processor 20 additionally includes a microphone 125 for entering speech, a speaker 126 for outputting speech and a converter 127 made up of an analog/digital converter for converting the speech signal from the microphone 125 into speech data and a digital/analog converter for converting the speech data into speech signals. Finally, the information processor 20 includes a function extension unit 129 connected to an IC card 128 or the like for transmission and reception of programs or data, a system controller 130 for controlling the key switch 120, SPI 121, IR 122 and the MODEM unit 123, and a power source circuit 133 for supplying the power from an AC adapter 131 or a rechargeable battery 132 to the power consuming units or components.

The CPU 113 executes a variety of application programs previously stored in the ROM 112, such as, for example, a kana-kanji conversion program for word processors, an associated dictionary table, a handwritten letter recognition program, an associated dictionary table, or a program for remote controlling a television receiver or the like. The CPU 113 causes data required to be saved even with the power source being turned off, such as data for documents, schedules or addresses, or learned remote control data by the user, to be stored in the RAM 114.

Thus the LCD controller 119 routes picture data as read from the video RAM 115 to the LCD 111 under control by the CPU 113. The LCD 111 has a horizontal array of 512 electrodes and a vertical array of 342 electrodes, associated with 512×342 pixels providing a pre-set resolution, and a driving circuit, not shown, for applying a pre-set voltage across these electrodes. The driving circuit sequentially applies a pre-set voltage across the vertical array of 342 electrodes, while sequentially applying a pre-set voltage across the horizontal array of 512 electrodes, based upon picture data supplied to the LCD 111 via the LCD controller 119. As a result, the pixels of the LCD 111 are scanned and a corresponding picture is displayed on the LCD 111. The LCD 111 also includes a phosphor plate for background light for radiating the light from the back surface of the liquid crustal display plate and an invertor circuit for converting the voltage supplied from the power source circuit 133 and supplying the converted voltage to the phosphor plate.

The touch-screen 117 comprises a transparent tablet member arranged on the front side of the LCD 111. The touch-screen 117 is designed so that a picture transmitted through the tablet and displayed on the LCD 111 may be viewed and the position information on the screen of the LCD 111 may be entered using a dedicated pen, not shown.

Specifically, the tablet of the touch-screen 117 has a horizontal array of 512 electrodes and a vertical array of 342 electrodes, corresponding to the pre-set resolution of the LCD 111, and a clock generator, not shown, for applying a pre-set voltage across these electrodes. The clock generator sequentially applies a pre-set voltage across the 342 vertical electrodes and 512 horizontal electrodes, under control by the tablet controller 118, for scanning the tablet. The pen has a switch at its distal end, such that, when the pen is applied to the tablet, a pre-set capacitance is formed between the tablet and the pen. When the pen is pressed against the tablet, the switch on the distal end of the pen is turned on. The tablet controller 118 detects the charges generated between the tablet and the pen when the switch is turned on for detecting the position of the pen. The position coordinate information thus produced is routed to the CPU 113. The CPU 113 permanently monitors a position where the pen is pressed against the tablet to turn on the switch, a pen-down position, and a position where the pen is detached from the tablet to turn off the switch, a pen-down position for accepting the input by the pen-down and establishing the input by the pen-down.

Thus the coordinate information for the letter or the symbol as entered by the user is supplied to the CPU 113, which then executes the letter recognition program. The letter entered by the user is recognized and the kana-kanji conversion program is executed so that the document or the like entered by the user is stored in the RAM 114. The touch-screen 117 is also designed so that information data displayed on the display screen may be selected by the user directly touching the touch-screen 117 with the finger's end or the like.

The CPU 113 also executes the remote control program and reads out system control data stored in the RAM 114, which is supplied to the system controller 130. The remote controller 130 transmits the remote control data as transmission data to, for example, the television receiver, via the IR interface 122, for remote controlling the television receiver.

The CPU 113 also performs control operations for supplying speech data to the converter 127 or fetching the speech data from the converter 127 in order to output the speech from the speaker 126 and in order to fetch speech data of the speech collected by the microphone 125.

The CPU 113 includes, in addition to the above-mentioned application programs, a software program stored in the ROM 112 for initializing the telephone unit 10, an electronic mail software program for performing data communication over the telephone network 4 connected to the telephone unit 10, for example, transmitting and receiving electronic mail, an electronic mail display software for reading the received electronic mail via the RAM 114 for displaying the read-out mail, a software program for scrutinizing the charged state of the battery 132 and a software program for ringing a special ringer sound when a telephone call is made from outside. The CPU 113 also outputs a command for lighting or extinguishing the mail LED 51, data LED 52 and the charge LED 53 of the telephone unit 10 to the telephone unit 10 over the serial cable 30, in order to display the state of the information processor 20 on the LCD 111, that is the information indicating the possible presence of newly received electronic mail or unread electronic mail, the information indicating that data communication is going on, or the information indicating the charged state of the battery 132. The above commands are referred to hereinafter as the mail LED lighting command, data LED lighting command, charge LED green lighting command and the charge LED red lighting command. The SPI 121 has the function of serial semi-duplex synchronous communication and outputs the commands supplied from the system controller 130 to the telephone unit 10 over the serial cable 30 comprised of the clock and data lines. The CPU 113 also outputs a disconnect command for disconnecting the telephone unit 10 from the telephone network 4 during data communication and a ringer-off command of inhibiting the ringing of the ringer sound in the telephone unit 10.

Figure 10:
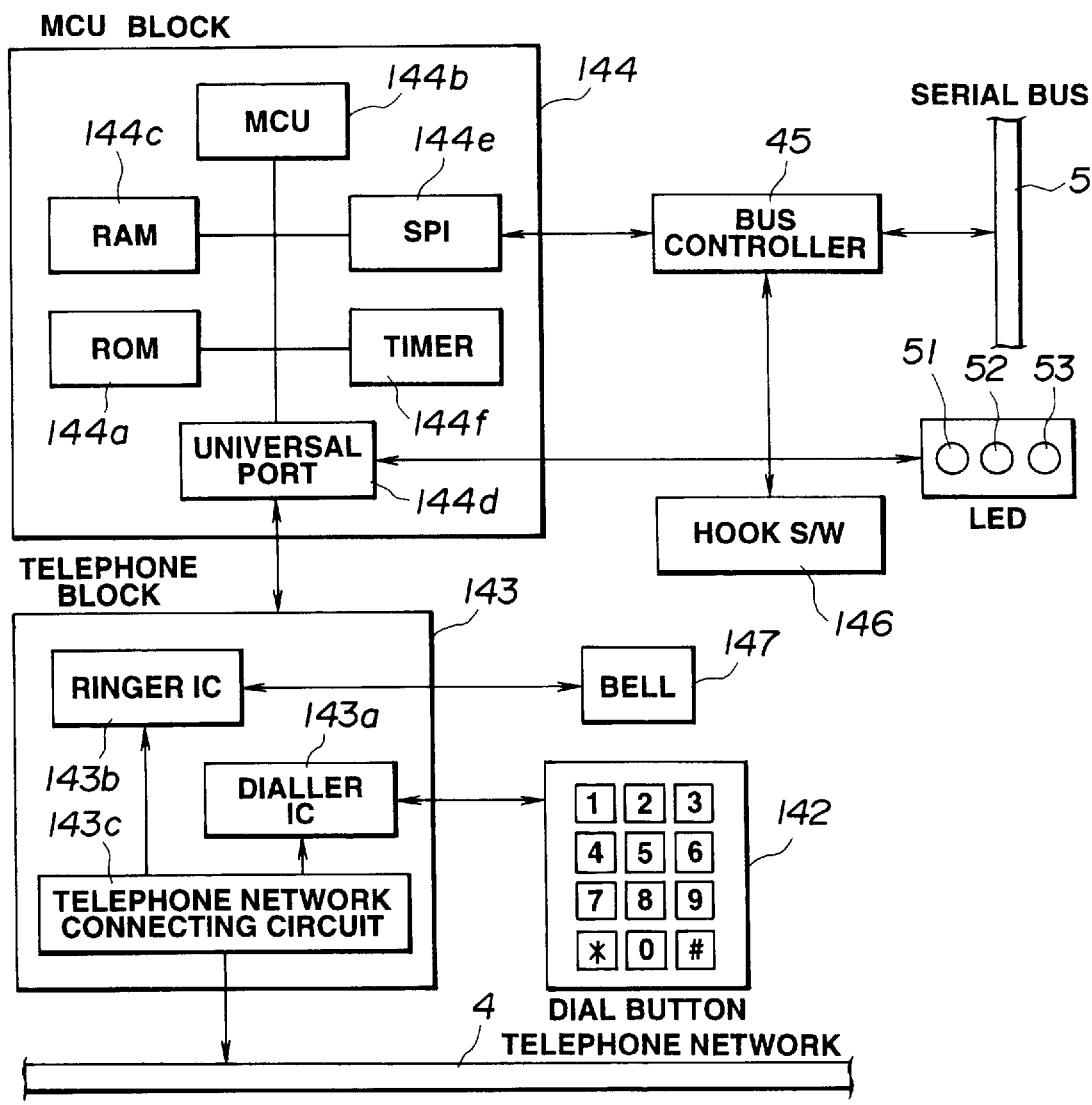
FIG. 10 is a more detailed view of a telephone unit and processing unit according to the second embodiment of the invention.

The telephone unit 10 embodying the present invention is now explained. Referring to FIG. 10, the telephone unit 10 includes the keypad 142, made up of twelve key switches, a telephone block 143 for dialling the dialling information after conversion thereof from the matrix information from the keypad 142 and an MCU block 144 formed by a one-chip micro-computer for controlling the telephone block 143 based upon the various commands from the information processor 20. The telephone unit 10 also includes a bus controller 145 for controlling data flow on the serial bus, a hook switch 146 for detecting the off-hook state of the handset 15, a bell 147 for ringing the ringer sound and the above-mentioned mail LED 51, data LED 52 and the charge LED 53.

The telephone block 143 includes a dialler IC 143a for outputting tone signals and dial pulse signals based upon the matrix information from the keypad 142, a ringer IC 143b for ringing the bell 147 and a telephone network connecting circuit 143c having the function of disconnecting the telephone block 143 from the telephone network 4, as also shown in FIG. 10.

The MCU block 144 includes a ROM 144a having the control program or the like pre-stored therein, an MCU 144b for executing the program stored in the ROM 144a, a RAM 144c for storing data used during execution of the control program, a universal port 144d for controlling the bus controller 145, the mail LED 51, data LED 52 and the charge LED 53, an SPI 144e for receiving various commands transmitted from the information processor 20 and a timer 144f for timing setting, as also shown in FIG. 10.

When the user uplifts the handset 15, the MCU 144b detects the off-hook state of the hook switch 146 via the universal port 144d and controls the telephone network connecting circuit 143c so that the telephone unit 10 is connected to the telephone network 4, that is, so that the dialler IC 143a and the ringer IC 143b are connected to the telephone network 4.

When the user then presses the dial button 142, the dialler IC 143a converts the matrix information from the dial button 142 to dialling signals, such as dial pulse signals, which are transmitted to the telephone network 4 via the telephone network connecting circuit 143c. When the message channel is established, the user is in a position of having a talk with the called party using the handset 15.

In addition to performing the above-mentioned functions of the conventional telephone unit, the telephone unit 10 lights and extinguishes the LEDs 51 to 53, and controls the ringer IC 143b and the telephone network connecting circuit 143c, under commands supplied from the information processor 20.

Specifically, the MCU 144b controls the bus controller 145 via the universal port 144d for controlling the data flow on the serial bus. The SPI 144e has the function of serial semi-duplex synchronous communication and receives various commands supplied from the information processor 20 while supplying the received commands to the MCU 144b.

The MCU 144b lights the mail LED 51 and the data LED 52 on reception of the mail LED lighting command and the data LED lighting command via the universal port 144d, respectively. On the other hand, on reception of the charge LED green lighting command or the charge LED red lighting command, the MCU 144b lights the charge LED 53 in green or red. That is, the charge LED 53 has a green LED and a red LED. The MCU 144b also controls the telephone network connecting circuit 143c for disconnecting the dialler IC 143a and the ringer IC 143b from the telephone network 4 on reception of the disconnect command, while controlling the ringer 143b for inhibiting the ringing of the ringer 143b on reception of the ringer off command. The MCU 144b periodically causes an interrupt in the operation sequence of the information processor 20 by the timer 144f via the SPI 144e in order to make a request for transmission of various commands from the information processor 20.

The operations of the information processor 20 and the telephone unit 10 on execution of the software for initializing the telephone network 10 and the electronic mail software will now be explained in detail.

First, the operation of the information processor 20 on execution of the software for initializing the telephone unit 10 is explained.

This software is executed on the turning on of the power source switch, on connecting the information processor 20 to the telephone unit 10 and on detection of the connection of the telephone unit 10, with the power source turned on. The CPU 113 then issues a variety of commands to the telephone unit 10.

Figure 11:
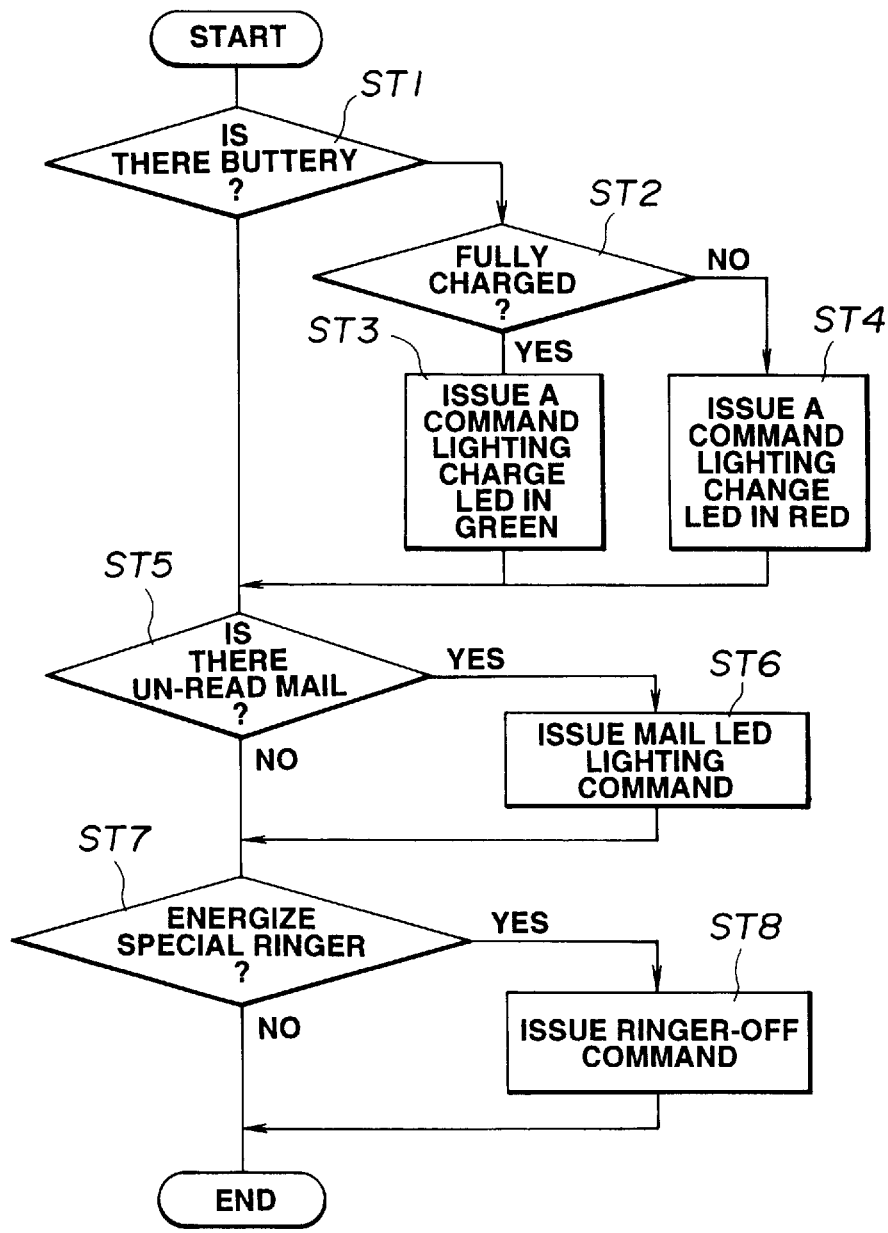
FIG. 11 is a flow chart, illustrating the operation of a CPU according to the invention.
Figure 12:
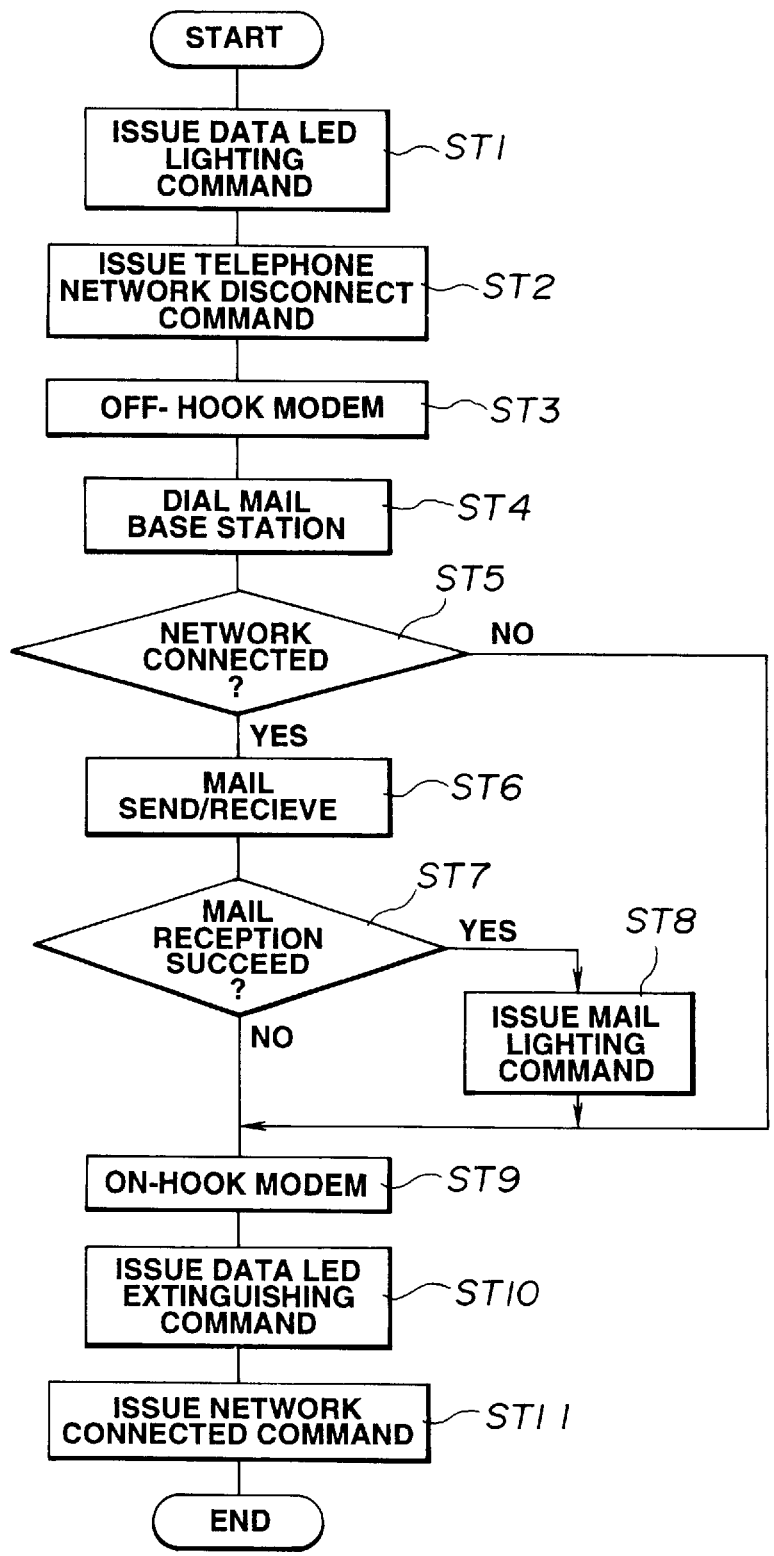
FIG. 12 is a flow chart illustrating an operation for avoiding a communication failure in accordance with the invention.

Referring to FIG. 11, the CPU 113 detects at a step ST1 whether or not the battery 132 is enclosed. If the result is YES, the CPU 113 transfers to a step ST2 and, if otherwise, the CPU 113 transfers to a step ST5.

At the step ST2, the CPU 113 reads the voltage of the battery 132 and scrutinizes the charged state of the battery 132 based upon the read voltage value. If the battery 132 is fully charged, the CPU 113 proceeds to a step ST3 and otherwise to a step ST4. That is, the power source circuit 133 converts the voltage supplied from the AC adapter 131 or the battery 132 to voltages required by the information processor 20, for example, +36 V, +5 V, +13.3 V or +3 V, while causing the battery 132 to be charged and detecting the voltage of the battery 132. The CPU 113 also scrutinizes the charged state of the battery 132 based upon the voltage detected by the power source circuit 133.

At the step ST3, the CPU 113 transmits the charge LED green lighting command, indicating the fully charged state of the battery 132, to the telephone unit 10. The CPU 113 then transfers to the step ST5.

At the step ST4, the CPU 113 transmits the charge LED red lighting command, indicating the state other than the fully charged state of the battery 132, to the telephone unit 10, before proceeding to the step ST5.

At the step ST5, the CPU 113 scrutinizes the possible presence of un-read electronic mail. If there is any, the CPU 113 proceeds to a step ST6 and otherwise to a step ST7.

At the step ST6, the CPU 113 transmits the mail LED lighting command to the telephone network 10, before proceeding to the step ST7.

At the step ST7, the CPU 113 checks whether or not the user has set the mode of ringing a special ringer using the key switch 120 or the like. If such a mode is set, the CPU 113 proceeds to a step ST8 and, if otherwise, the program comes to an end.

At the step STB, the CPU 113 transmits the ringer-off command to the telephone unit 10 and causes the program to be terminated.

The operation of the information processor 10 on execution of the electronic mail software is now explained. The CPU 113 executes the electronic mail software and, if electronic mail is to be sent, data stored in the RAM 114, herein the telegram letters or a file, is read out and transmitted to the SCI 124. The SCI 124 has the function of, for example, synchronous serial transmission, and transmits data read out from the RAM 114 to the MODEM unit 123 as serial data, while outputting a command of controlling the MODEM unit 123. The MODEM unit 123 modulates the serial data in a pre-set manner and outputs the resulting modulated data over the telephone network 4. On reception of the electronic mail, the CPU 113 causes data as demodulated by the MODEM unit 123 to be stored in the RAM 114 via the SCI 124, while causing the telegram letters of the electronic mail to be displayed on the LCD 111.

Meanwhile, some measures must be taken lest the data communication should fail due to the user inadvertently making a telephone call while the transmission and reception of electronic mail is proceeding as described above. To this end, the information processor 20 transmits the information indicating that the transmission or reception of the electronic mail is going on via the SPI 121 or the serial cable 30 to the telephone unit 10 in accordance with the flow chart shown in FIG. 12. This program is executed when the user has selected to send electronic mail to a receiving party, or when the system software checks as to whether or not there is any mail addressed to the user, either automatically or on the user's selection.

At a step ST1, the CPU 113 transmits a data LED lighting command, indicating that the data communication is going on, to the telephone unit 10. The CPU 113 then transfers to a step ST2.

At the step ST2, the CPU 113 transmits to the telephone network 10 a disconnect command of disconnecting the telephone unit 10 from the telephone network 4. The CPU 113 then transfers to a step ST3.

At the step ST3, the CPU 113 controls the MODEM unit 123 to the off-hook state, before proceeding to a step ST4.

At the step ST4, the CPU 113 dials the telephone number of the base station of the electronic mail, before proceeding to a step ST5.

At the step ST5, the CPU 113 detects whether or not the network with the base station has been established. If the result is YES, the CPU 113 proceeds to a step ST6 and otherwise to a step ST9.

At the step ST6, the CPU 113 transmits or receives the electronic mail, before proceeding to a step ST7.

At the step ST7, the CPU 113 decides whether or not electronic mail has been received. If the result is YES, the CPU 113 proceeds to a step ST8 and otherwise to a step ST9.

At the step ST8, the CPU 113 transmits a mail LED lighting command to the telephone unit 10, before proceeding to a step ST9.

At the step ST9, the CPU 113 controls the MODEM unit 123 to the on-hook state, before proceeding to a step ST10.

At the step ST10, the CPU 113 transmits to the telephone unit 10 a data LED extinguishing command for terminating data communication and turning off the data LED 52. The CPU 113 then transfers to a step ST11.

At the step ST11, the CPU 113 transmits to the telephone unit 10 a connecting command for connecting the telephone unit 10 to the telephone network 4. The CPU 113 then terminates the operation of transmitting or receiving the electronic mail.

Figure 13:
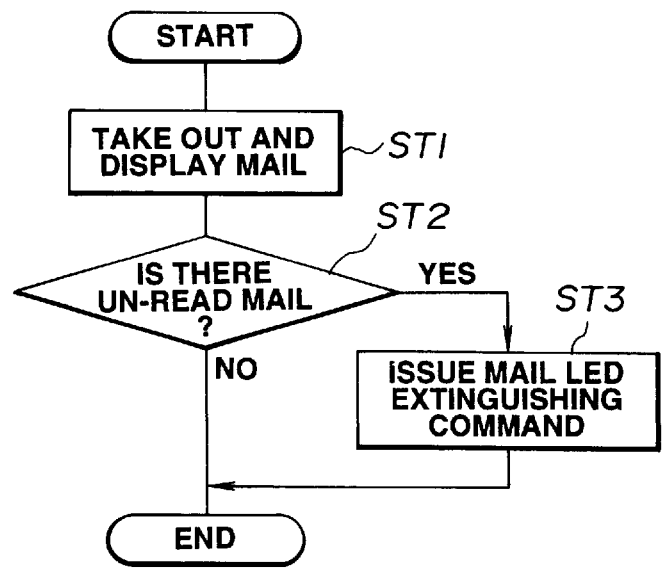
FIG. 13 is a flow chart describing the operation for reading electronic mail with the system according to the present invention.

When the user becomes aware of the fact that electronic mail has been received, and proceeds to an operation of reading the electronic mail, the CPU 113 starts running the mail display software for reading out and displaying un-read electronic mail shown in FIG. 13.

At a step ST1 in FIG. 13, the CPU 113 causes the file of the electronic mail to be read from the RAM 114 and displayed on the LCD 111. When the user has read the mail and makes a corresponding operation, the CPU 113 proceeds to a step ST2.

At the step ST2, the CPU 113 checks for the possible presence of un-read electronic mail. If there is un-read mail, the CPU 113 proceeds to a step ST3 and, if there is none, the CPU 113 causes the program to be terminated.

At the step ST3, the CPU 113 transmits to the telephone unit 10 a mail LED extinguishing command, indicating that there is no un-read mail. The CPU 113 then causes the program to be terminated.

The operation of the information processor 20 on execution for the software of checking the charged state of the battery 132 is, now explained. In the power down state, that is with the so-called sleep mode, the CPU 113 transmits to the telephone unit 10 the charged state of the battery 132 based upon the voltage as detected by the power source circuit 133, in synchronism with timer interrupt periodically generated by the RTC 116, as indicated by the flow chart shown in FIG. 14.

Figure 14:
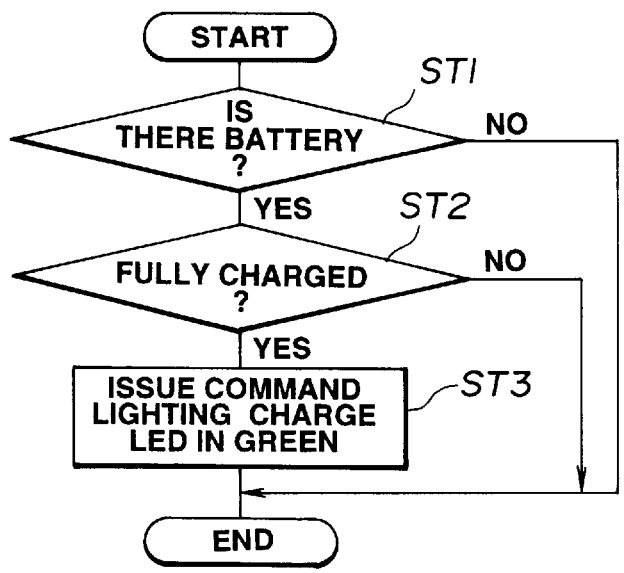
FIG. 14 is a flow chart illustrating a battery charge detection operation.

At a step ST1 in FIG. 14, the CPU 113 detects whether or not the battery 132 is enclosed. If the result is YES, the CPU proceeds to a step ST2 and, if otherwise, the program is terminated.

At the step ST2, the CPU 113 reads the voltage of the battery 132 from the power source circuit 133, and gives a decision as to whether or not the battery 132 is fully charged. If the result is YES, the CPU 113 proceeds to a step ST3 and, if otherwise, the program is terminated.

At the step ST3, the CPU transmits to the telephone unit 10 a charge LED green lighting command indicating the fully charged state of the battery 132. The program is then terminated. Thus the charged state of the battery 132 may be ascertained without the necessity for the user to turn on the power source switch of the information processor 20 each time.

The operation of the information processor 20 on execution of the software designed for producing a special ringer sound on reception of a telephone call is now explained. This software program is executed to determine whether the special ringer sound should be produced by the information processor 20.

Figure 15:
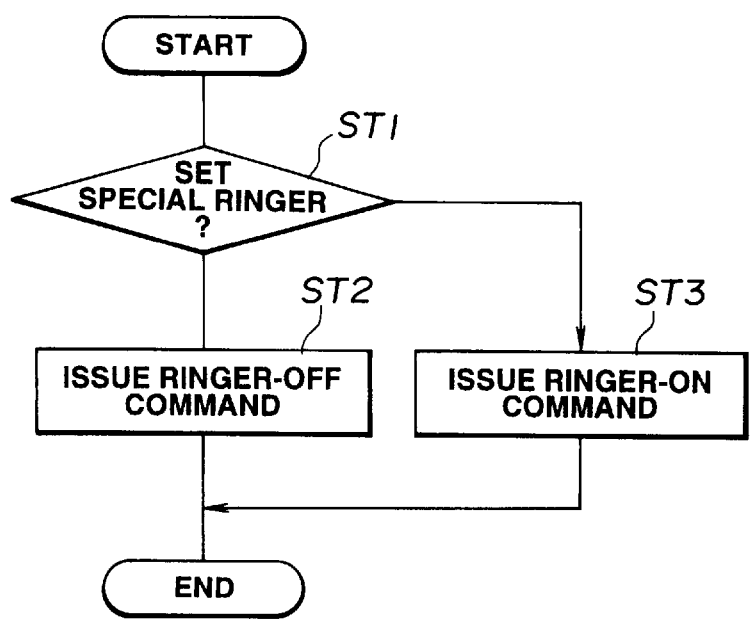
FIG. 15 is a flow chart that describes an operation by which the processor of the present invention detects selection of a special ringer.

At a step ST1 in FIG. 15, the CPU 113 determines whether or not the user has set the key switch 120 so that the ringer sound should be produced by the information processor 20. If the result of decision is YES, the CPU 113 proceeds to a step ST2 and otherwise to a step ST3.

At the step ST2, the CPU 113 transmits a ringer-off command indicating that no ringer sound is to be produced at the telephone unit 10. The program is then terminated. If at this time a ringer sound is detected by, for example, the MODEM unit 123, the CPU 113 causes a special ringer sound to be produced from the speaker 26.

At the step ST3, the CPU 113 transmits to the telephone unit 10 a ringer-on command for producing the ringer sound by the telephone unit 10, before terminating the program.

The formats of the various commands transmitted from the information processor 20 to the telephone unit 10 are briefly explained. The command is made up of, for example, two bytes, with the upper byte, or kind or type byte, indicating the kind or type of the device to be controlled and the lower byte, or contents byte indicating the control contents.

For example, if the kind byte is a code representing 'M', the command is a mail command. If also the contents byte is '1' or '0', the command indicates that the mail LED 51 should be lighted or extinguished, respectively.

If the kind byte is a code representing 'D', the command is a data LED command. If also the contents byte is '1' or '0', the command indicates that the data LED 52 should be lighted or extinguished, respectively.

If the kind byte is a code representing 'C', the command is a charge LED command. If also the contents byte is '1', '2' or '0', the command indicates that the charge LED 53 should be lighted in green or in red or the charge LED should be extinguished, respectively.

If the kind byte is a code representing 'L', the command is a connecting command to the telephone network 4 of the telephone unit 10. If also the contents byte is '1' or '0', the command indicates that the telephone unit 10 should be connected to or disconnected from the telephone network 4, respectively.

If the kind byte is a code representing 'R', the command is a ringer command. If also the contents byte is '1' or '0', the command indicates that the ringer sound should be produced or should not be produced, respectively.

Figure 16:
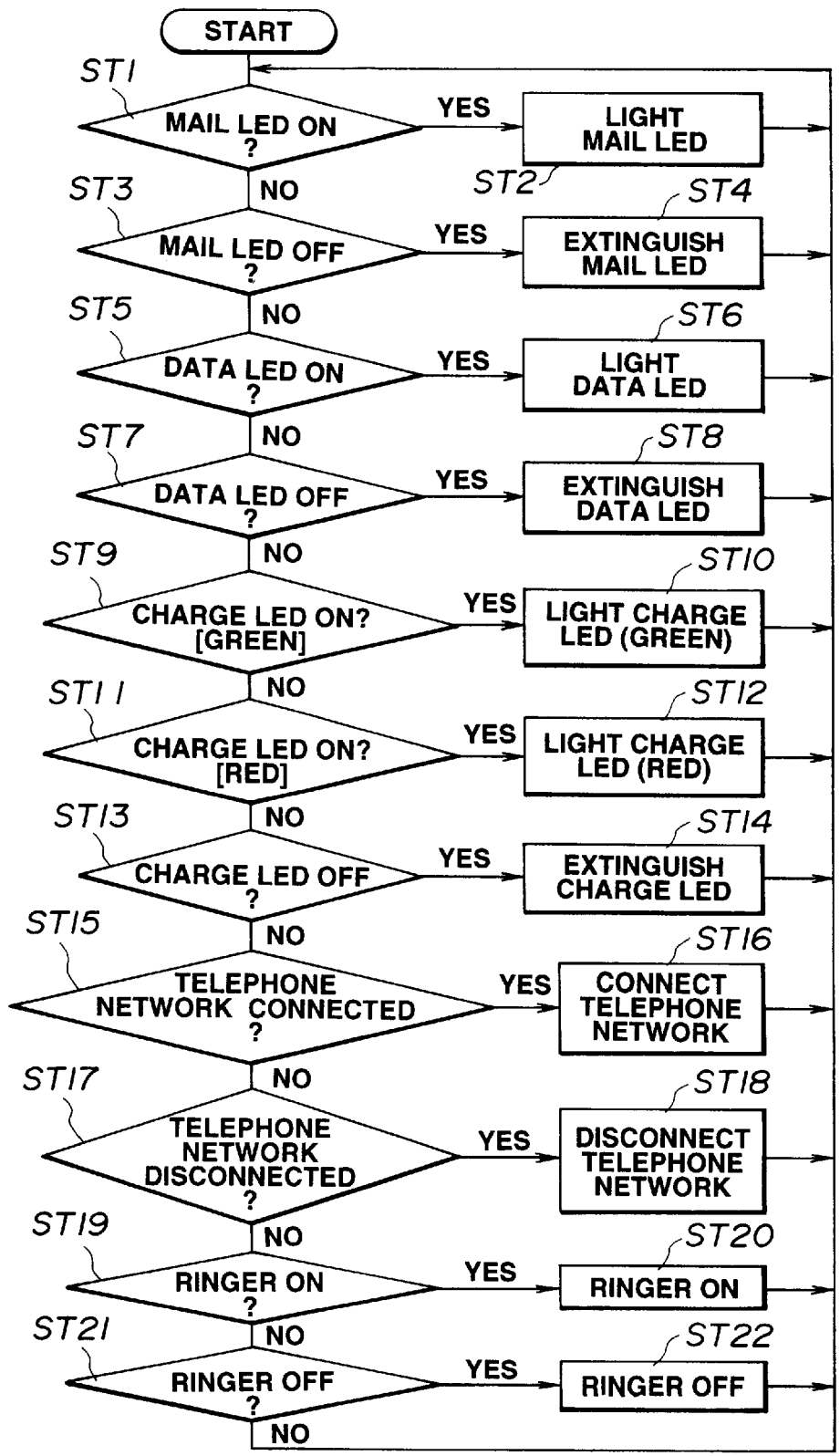
FIG. 16 is a flow chart describing the general operation of a telephone system according to the invention.

Referring to the flow chart of FIG. 16, the operation of the telephone unit 10 associated with the above-described operation of the information processor 20 is now explained.

The MCU 144b of the telephone unit 10 continuously monitors data received by the SPI 144e. At a step ST1, the MCU 144b determines whether or not the mail LED lighting command has been received. If the result is YES, the MCU 144b proceeds to a step ST2 and otherwise to a step ST3.

At the step ST2, the MCU 144b lights the mail LED 51 before reverting to the step ST1. Thus it is possible for the user to ascertain the presence of an un-read electronic mail by the display on the telephone unit 10 by simply connecting the information processor 20 to the telephone unit 10 without turning on the information processor 20 or starting the electronic mail software.

At the step ST3, the MCU 144b determines whether or not the mail LED extinguishing command has been received. If the result is YES, the MCU 144b proceeds to a step ST4 and otherwise to a step ST5.

At the step ST4, the MCU 144b causes the mail LED 51 to be extinguished before reverting to the step ST1. As a result, it becomes possible for the user to ascertain the absence of un-read electronic mail by the display on the telephone unit 10 by simply connecting the information processor 20 to the telephone unit 10 without turning on the information processor 20 or starting the electronic mail software.

At the step ST5, the MCU 144b determines whether or not the data LED lighting command has been received. If the result is YES, the MCU 144b proceeds to a step ST6 and otherwise to a step ST7, At the step ST6, the MCU 144b lights the data LED 52 before reverting to the step ST1. Thus it becomes possible for the user to ascertain that the data communication is going on based upon the display on the telephone unit 10.

At the step ST7, the MCU 144b determines whether or not the data LED extinguishing command has been received. If the result is YES, the MCU 144b proceeds to a step ST8 and otherwise to a step ST9.

At the step ST8, the MCU 144b extinguishes the data LED 52, before reverting to the step ST1. Thus it becomes possible for the user to ascertain that the data communication is not going on based upon the display on the telephone unit 10.

At the step ST9, the MCU 144b determines whether or not the charge LED green lighting command has been received. If the result is YES, the MCU 144b proceeds to a step ST10 and otherwise to a step ST11.

At the step ST10, the MCU 144b causes the charge LED 53 to be lighted in green, before reverting to the step ST1. As a result, it becomes possible for the user to ascertain the fully charged state of the battery 132 of the information processor 20, based on the display on the telephone unit 10, by an interrupt by the RTC 116 of the sequence of operations executed in the information processor 20 without turning on the power source switch of the information processor 20.

At the step ST11, the MCU 144b determines whether or not the charge LED red lighting command has been received. If the result is YES, the MCU 144b proceeds to a step ST12 and otherwise to a step ST13.

At the step ST12, the MCU 144b causes the charge LED 53 to be lighted in red, before reverting to the step ST1. As a result, it becomes possible for the user to ascertain the state other than the fully charged state of the battery 132 of the information processor 20 based on the display on the telephone unit 10 without turning on the power source switch of the information processor 20.

At the step ST13, the MCU 144b determines whether or not the charge LED red extinguishing command has been received. If the result is YES, the MCU 144b proceeds to a step ST14 and otherwise to a step ST15.

At the step ST14, the MCU 114b extinguishes the charge LED 53 before reverting to the step ST1.

At the step ST15, the MCU 144b determines whether or not a connection command has been received. If the result is YES, the MCU 144b proceeds to a step ST16 and otherwise to a step ST17.

At the step ST16, the MCU 144b causes the telephone unit 10 to be connected to the telephone network 4 before reverting to the step ST1.

At the step ST17, the MCU 144b determines whether or not the disconnect command has been received. If the result is YES, the MCU 144b proceeds to a step ST18 and otherwise to a step ST19.

At the step ST18, the MCU 144b disconnects the telephone unit 10 from the telephone network 4, before reverting to the step ST1. As a result, data communication may be prosecuted normally even if the user inadvertently makes a telephone call in the course of the data communication.

At the step ST19, the MCU 144b determines whether or not the ringer-on command has been received. If the result is YES, the MCU 144b proceeds to a step ST20 and otherwise to a step ST21.

At the step ST20, the MCU 144b controls the ringer IC 143b so that the bell 147 is activated on detection of the ringer signal by the ringer 143b. The MCU 144b then reverts to the step ST1.

At the step ST21, the MCU 144b determines whether or not the ringer-off command has been received. If the result is YES, the MCU 144b proceeds to a step ST22 and otherwise to a step ST23.

At the step ST22, the MCU 144b controls the ringer 143b so that the bell 147 is not activated. As a result, it becomes possible for the user to prevent the ringer sound from being produced in the telephone unit 10 if the user has set the information processor 20 so that the ringer sound is produced therein, with the consequence that it becomes possible to prevent both ringer sounds from being produced to produce an extremely noisy ringer sound.

Figure 17:
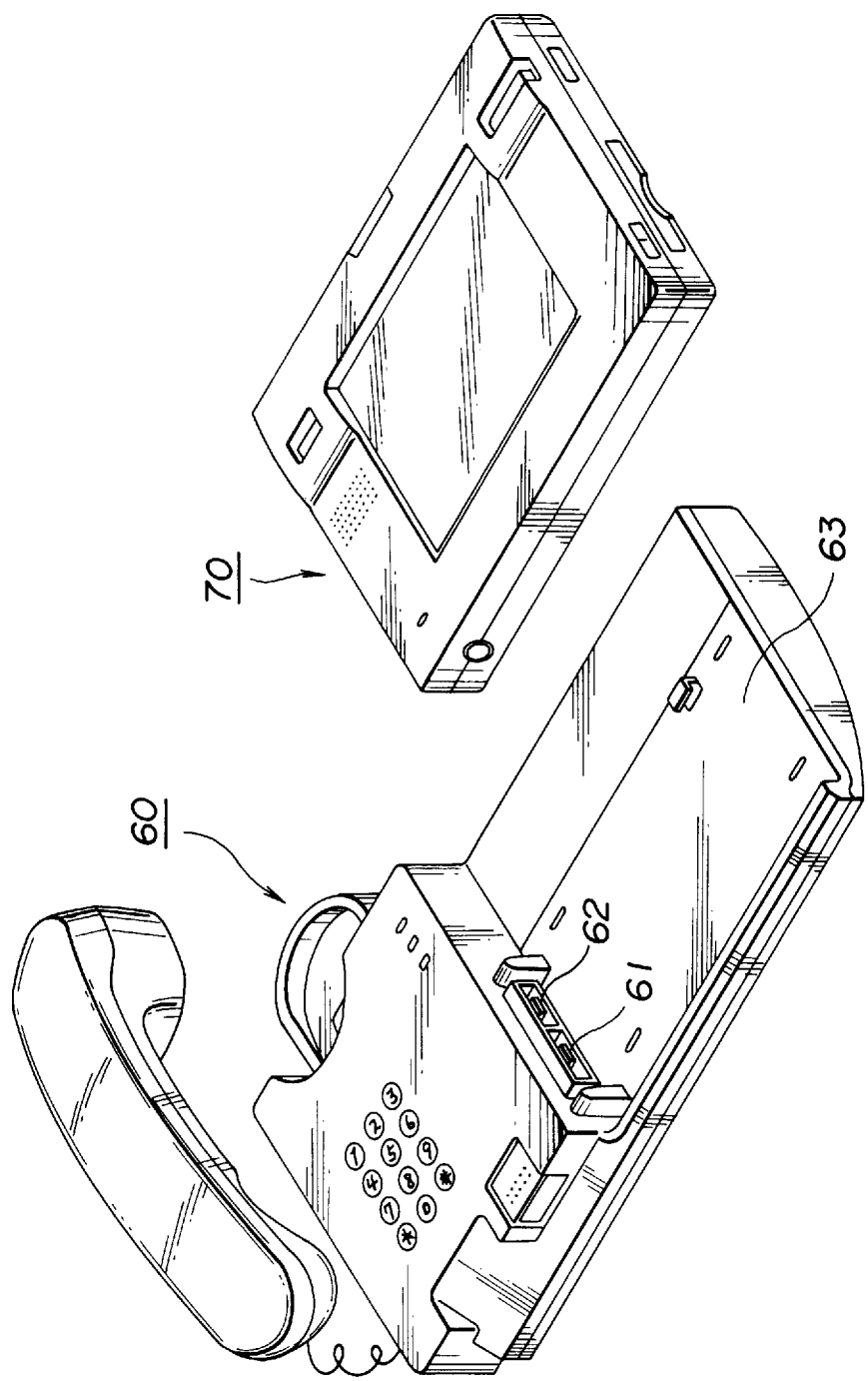
FIG. 17 is a representative view of a telephone system according to the present invention which utilizes a plug-in structure.

With the above-described embodiment, the information processor 20 is connected to the telephone unit 10 via the serial cable 30. The serial cable 30 may however be eliminated by providing a so-called plug-in structure in which a telephone unit 60 is provided with connection connectors 61, 62 and a setting portion 63 for setting an information processor 70 and the information processor 70 is provided with two connectors, not shown, facing the connectors 61, 62, respectively, as shown for example in FIG. 17.

The telephone unit 10 may also be unified to the information processor 20. This enables the cable or the connectors to be eliminated for further simplifying the structure. Also, the dialling operation may be performed on the touch-screen for facilitating the operation.

What is claimed is:
1. A telephone system comprising:
 a communication bus;
 a telephone unit having at least a handset, a key pad, a telephone circuit, and a telephone processing unit, said telephone unit connected to said communication bus;
 said telephone circuit generating a dialling signal and a hook signal responsive to operation of said key pad and said handset, respectively, said telephone circuit providing said telephone processing unit with said dialling signal and said hook signal;
 an information processing unit connected to said communication bus for receiving said dialling signal and said hook signal from said telephone processing unit and for producing a telephone log including a telephone number, a start time, and a stop time for a call made to said telephone number;

wherein said communication bus is for bi-directionally transmitting data between said information processing unit and said telephone unit processing unit.

2. The telephone system as claimed in claim 1, wherein said information processing unit has means for preparing a telephone number card including at least said telephone number information and name information associated with said telephone number.

3. The telephone system as claimed in claim 2, wherein said information processing unit has means for receiving said dialling signal and said hook signal from said telephone unit as data and registering said data in said telephone number card.

4. The telephone system as claimed in claim 2, wherein said information processing unit has a timer function and means for receiving the hook signal from said telephone unit and maintaining said log of the timing information derived from the timer function.

5. The telephone system as claimed in claim 2, wherein said telephone number card further includes an address and a birthday associated with said name information.

6. The telephone system as claimed in claim 1, wherein said information processing unit has means for preparing a message based upon character information input into said information processing unit, means for displaying the message, and means for transmitting the displayed message over an external telephone line.

7. The telephone system as claimed in claim 6, wherein said information processing unit has means for producing a first specific signal transmitted to said telephone unit through said communication bus, said first specific signal indicating a first state of the information processing unit in which said message is being transmitted through said external telephone line.

8. The telephone system as claimed in claim 7, wherein said telephone processing unit includes means for receiving said first specific signal and means for informing an operator of the information processing unit being in said first state.

9. The telephone system as claimed on claim 8, wherein said telephone circuit includes means for disconnecting said external telephone line responsive to said first specific signal.

10. The telephone system as claimed in claim 1, wherein said information processing unit has means for receiving a message transmitted over an external telephone line and means for storing the message.

11. The telephone system as claimed in claim 10, wherein said information processing unit also has means for producing a second specific signal which is transmitted to said telephone processing unit through said communication bus, said second specific signal indicating a second state of the information processing unit in which said message is stored in said storing means.

12. The telephone system as claimed in claim 11, wherein said telephone processing unit has means for receiving said second specific signal and means for informing an operator of the information processing unit being in said second state.

13. The telephone system as claimed in claim 1, wherein said communication bus comprises a serial bus and said telephone processing unit comprises a serial to parallel interface circuit.

14. The telephone system as claimed in claim 1, wherein said telephone unit further comprises means for indicating a charged state of a battery in said information processing unit, said indicating means being controlled by said telephone processing unit in response to a command issued by said information processing unit.

15. The telephone system as claimed in claim 1, wherein said telephone unit is connected to an external phone line and further comprises means for indicating a state of said external telephone line, said indicating means being controlled by said telephone processing unit in response to a command issued by said information processing unit.

16. The telephone system as claimed in claim 1, wherein said telephone unit further comprises means for indicating that a message has been received, said indicating means being controlled by said telephone processing unit in response to a command issued by said information processing unit.

17. The telephone system as claimed in claim 1, wherein said telephone unit includes a first ringer and said information processing unit includes a second ringer, said information processing unit having a key switch for causing said telephone processing unit to disable said first ringer and for activating said second ringer.

18. The telephone system as claimed in claim 1, further comprising means associated with said information processing unit for displaying information stored in said processing unit.

19. The telephone system as claimed in claim 18, wherein said means for displaying information comprise a liquid crystal display.

20. The telephone system as claimed in claim 18, further comprising an electronic tablet for receiving information to be input to said information processing unit.

21. The telephone system as claimed in claim 20, wherein said electronic tablet is transparent and is formed over a display such that the tablet and display function together as a touch-screen.

22. The telephone system as claimed in claim 20, wherein said electronic tablet may be written upon by an operator using a dedicated pen and said information processing unit comprises means for recognizing said writing and converting said writing into computer-readable text.

23. The telephone system as claimed in claim 1, wherein:
said information processing unit is disposed in a first housing and said telephone unit is disposed in a second housing; and
said first housing includes a receptacle in which said second housing may be placed, thereby automatically connecting said processing unit to said communication bus.

24. A method for telecommunication, comprising the steps of:
sending hook information for initiating an operation of telecommunication;
sending dialling information in response to a pressing of numeric keys on a phone;
processing said hook information and said dialling information for generating directory information;
displaying at least said directory information at a pre-set position of a display;
storing said directory information in a memory if said directory information is not pre-stored therein to create a log of all numbers dialled; and
sending said directory information to said phone such that any number in said log may be redialled from said directory information;
wherein said processing step comprises the step of generating log information including a telephone call start time and a telephone call stop time established by said hook information and a telephone number called derived from said dialling information.

25. A method for telecommunication wherein a telephone call and telecommunication message transmission are performed on a single telephone line, comprising the steps of:

producing a telecommunication message on a display screen of an information processing unit;

storing said telecommunication message in a memory within said information processing unit;

transferring said telecommunication message and dialing information to a telephone unit;

initiating a telephone call with said telephone unit on said single telephone line according to said dialing information;

sending said stored telecommunication message on said single telephone line from said telephone unit to a pre-set location identified by the dialling information; and displaying on said telephone unit a state in which said telecommunication message is being sent on said single telephone line.

26. The method for telecommunication as claimed in claim 25, further comprising the steps of:

receiving a telecommunication message on said single telephone line;

storing the received telecommunication message in said memory; and displaying a second state in which the received telecommunication message is being stored in said memory.

27. An apparatus for transmitting a telephone call and a telecommunication message over a single telephone line, comprising:

means for producing said telecommunication message on a display screen;

means for storing said telecommunication message and sending the stored telecommunication message responsive to dialling information received over said single telephone line;

means for receiving said telecommunication message over said single telephone line;

means for storing the received telecommunication message and for displaying the telecommunication message on said display screen; and means for displaying a first state in which said telecommunication message is being transmitted over said single telephone line or a second state in which said telecommunication message is stored in said storage means.

* * * * *